(12) United States Patent
Hata

(10) Patent No.: US 6,657,668 B1
(45) Date of Patent: Dec. 2, 2003

(54) METHOD, SYSTEM, AND COMPUTER READABLE MEDIUM FOR CONTROLLING AUTOMATIC FOCUSING OF A DIGITAL CAMERA

(75) Inventor: Daisuke Hata, Kawaguchi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/196,620

(22) Filed: Nov. 19, 1998

(30) Foreign Application Priority Data

Nov. 19, 1997 (JP) .............................. 9-336394

(51) Int. Cl.⁷ .................. H04N 5/232; G03B 13/00
(52) U.S. Cl. ...................... 348/349; 348/354
(58) Field of Search .................. 348/350, 353, 348/354, 356, 365, 345, 348, 349, 352; 396/123, 124

(56) References Cited

U.S. PATENT DOCUMENTS

| | | | | |
|---|---|---|---|---|
| 5,319,462 A | * | 6/1994 | Haruki et al. ................ | 348/353 |
| 5,442,397 A | * | 8/1995 | Yoshimura et al. .......... | 348/363 |
| 5,565,917 A | * | 10/1996 | Takeda ........................ | 348/354 |
| 5,699,116 A | * | 12/1997 | Yamazaki et al. ........... | 348/354 |
| 5,768,540 A | * | 6/1998 | Iwasaki ....................... | 396/123 |
| 5,995,767 A | * | 11/1999 | Lee et al. .................... | 396/123 |
| 6,333,761 B2 | * | 12/2001 | Yasuda ........................ | 348/346 |

OTHER PUBLICATIONS

U.S. patent application Ser. No. 09/196,620, filed Nov. 19, 1998, pending.
U.S. patent application Ser. No. 09/365,863, filed Aug. 3, 1999, pending.
U.S. patent application Ser. No. 09/196,620, filed Nov. 19, 1998, pending.
U.S. patent application Ser. No. 09/404,546, filed Sep. 24, 1999, pending.

* cited by examiner

*Primary Examiner*—Wendy R. Garber
*Assistant Examiner*—Matthew L Rosendale
(74) *Attorney, Agent, or Firm*—Oblon, Spivak, McClelland, Maier & Neustadt, P.C.

(57) ABSTRACT

A method, system and computer readable medium for an automatic focusing device including an optical system including receiving a light flux from an object to be photographed, the received light flux being passed through an optical system having a focusing lens system to form an image of the object and converting the received light flux into an output image signal; converting the image signal to output digital image data; outputting luminance data according to the digital image data as an automatic exposure (AE) evaluation value; setting at least an area of an imaging screen of an imaging device as an automatic focusing (AF) area; determining if the AE evaluation value is smaller than a predetermined value and setting an enlarged AF area as the AF area when the AE evaluation value is smaller than the predetermined value; integrating high frequency components of luminance data of image data in the AF area and outputting resulting data as an AF evaluation value; sampling AF evaluation values while moving the focusing lens system; and determining if the device is in focus based upon a result of the sampled AF evaluation values and driving the focusing lens system to a focusing position when the device is not in focus.

6 Claims, 7 Drawing Sheets

METHOD, SYSTEM, AND COMPUTER READABLE MEDIUM FOR CONTROLLING AUTOMATIC FOCUSING OF A DIGITAL CAMERA

BACKGROUND OF THE INVENTION

1. Field of the Invention

The present invention relates to an automatic focusing device, and more particularly to an automatic focusing device for a digital camera.

2. Discussion of the Background

An automatic focusing device for a digital camera is known, in which a high frequency component of an image signal, which is obtained by an imaging device, such as a charged coupled device (CCD), is passed through a high band pass filter (HPF) or band pass filter (BPF). Digital values according to the intensity of the image signals passed through the HPF or BPF are integrated so as to generate a focus evaluation value for each predetermined period of time (e.g., for one field). Then, the distance between a focusing lens and the imaging device is controlled such that the focus evaluation value becomes a peak value.

In such an automatic focusing device, generally, an area in an imaging area of the imaging device, which is used for determining the focus evaluation value and which is called an automatic focusing (AF) area, is located in the center part of the imaging area and has a predetermined fixed size.

The above-described focusing device has a deficiency in that an image which a photographer desires to photograph necessarily may not be in focus, if the AF area is large. For example, when a plurality of images which are located at different respective distances are photographed, the image which the photographer desires to focus typically may not be focused. Also, when the background of an image to be photographed is high in contrast relative to the image, the background of the image is focused depending upon, for example, a ratio between the image and the background in the AF area.

On the other hand, if the AF area is made small, even if an image located in the center of the AF area is intended to be focused, the image easily moves out of the AF area when the camera is moved or if the image itself slightly moves, which results in inaccurate focusing.

SUMMARY OF THE INVENTION

Accordingly, it is an object of the present invention to provide a novel and improved automatic focusing device for a digital camera that is capable of accurately focusing even when an image to be photographed is dark or low in contrast.

The above and other objects are achieved according to the present invention by providing a new and improved method, system and computer readable medium for controlling an automatic focusing device of a digital camera including receiving a light flux from an object to be photographed, the received light flux being passed through an optical system having a focusing lens system to form an image of the object and converting the received light flux into an output image signal; converting the image signal to output digital image data; outputting luminance data according to the digital image data as an automatic exposure (AE) evaluation value; setting at least an area of an imaging screen of an imaging device as an automatic focusing (AF) area; determining if the AE evaluation value is smaller than a predetermined value and setting an enlarged AF area as the AF area when the AE evaluation value is smaller than the predetermined value; integrating high frequency components of luminance data of image data in the AF area and outputting resulting data as an AF evaluation value; sampling AF evaluation values while moving the focusing lens system; and determining if the device is in focus based upon a result of the sampled AF evaluation values and driving the focusing lens system to a focusing position when the device is not in focus.

Another embodiment includes a method, system and computer readable medium for controlling an automatic focusing device of a digital camera including receiving a light flux from an object to be photographed, the received light flux being passed through an optical system having a focusing lens system to form an image of the object and converting the received light flux into an output image signal; converting the image signal to output digital image data; outputting luminance data according to the digital image data as an automatic exposure (AE) evaluation value; setting at least an area of an imaging screen of an imaging device as an automatic focusing (AF) area; integrating high frequency components of luminance data of image data in the AF area and outputting resulting data as an AF evaluation value; sampling AF evaluation values while moving the focusing lens system; and determining if the device is in focus based upon a result of the sampled AF evaluation values and driving the focusing lens system to a focusing position when the device is not in focus; and setting an enlarged AF area as the AF area before sampling the AF evaluation values when the AF evaluation value is smaller than a predetermined value.

Another embodiment includes a method, system and computer readable medium for controlling an automatic focusing device of a digital camera including receiving a light flux from an object to be photographed, the received light flux being passed through an optical system having a focusing lens system to form an image of the object and converting the received light flux into an output image signal; amplifying the image signal with a variable gain; converting the image signal to output digital image data; outputting luminance data according to the digital image data as an automatic exposure (AE) evaluation value; integrating high frequency components of luminance data of image data in an automatic focusing (AF) area and outputting resulting data as an AF evaluation value; sampling AF evaluation values while moving the focusing lens system; determining if the device is in focus based upon a result of the sampled AF evaluation values and driving the focusing lens system to a focusing position when the device is not in focus; and controlling the variable gain to increase the variable while sampling the AF evaluation values and when the AE evaluation value is smaller than a predetermined value.

Another embodiment includes a method, system and computer readable medium for controlling an automatic focusing device of a digital camera including receiving a light flux from an object to be photographed, the received light flux being passed through an optical system having a focusing lens system to form an image of the object and converting the received light flux into an output image signal; amplifying the image signal with a variable gain; converting the image signal to output digital image data; outputting luminance data according to the digital image data as an automatic exposure (AE) evaluation value; integrating high frequency components of luminance data of image data in an automatic focusing (AF) area and outputting resulting data as an AF evaluation value; sampling AF evaluation values while moving the focusing lens system;

determining if the device is in focus based upon a result of the sampled AF evaluation values and driving the focusing lens system to a focusing position when the device is not in focus; and controlling the variable gain to increase the variable while sampling the AF evaluation values, when the AF evaluation value is smaller than a predetermined value before the sampling the AF evaluation values.

Another embodiment includes a method, system and computer readable medium for controlling an automatic focusing device of a digital camera including receiving a light flux from an object to be photographed, the received light flux being passed through an optical system having a focusing lens system to form an image of the object and converting the received light flux into an output image signal; converting the image signal to output digital image data; outputting luminance data according to the digital image data as an automatic exposure (AE) evaluation value; integrating high frequency components of luminance data of image data in an automatic focusing (AF) area and outputting resulting data as an AF evaluation value; sampling AF evaluation values while moving the focusing lens system; determining if the device is in focus based upon a result of the sampled AF evaluation values and driving the focusing lens system to a focusing position when the device is not in focus; controlling an AE control operation in accordance with the AE evaluation value; setting the AE evaluation value for the AF area independently from the AE control operation; and executing an AF operation after the AE operation for the AF area.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
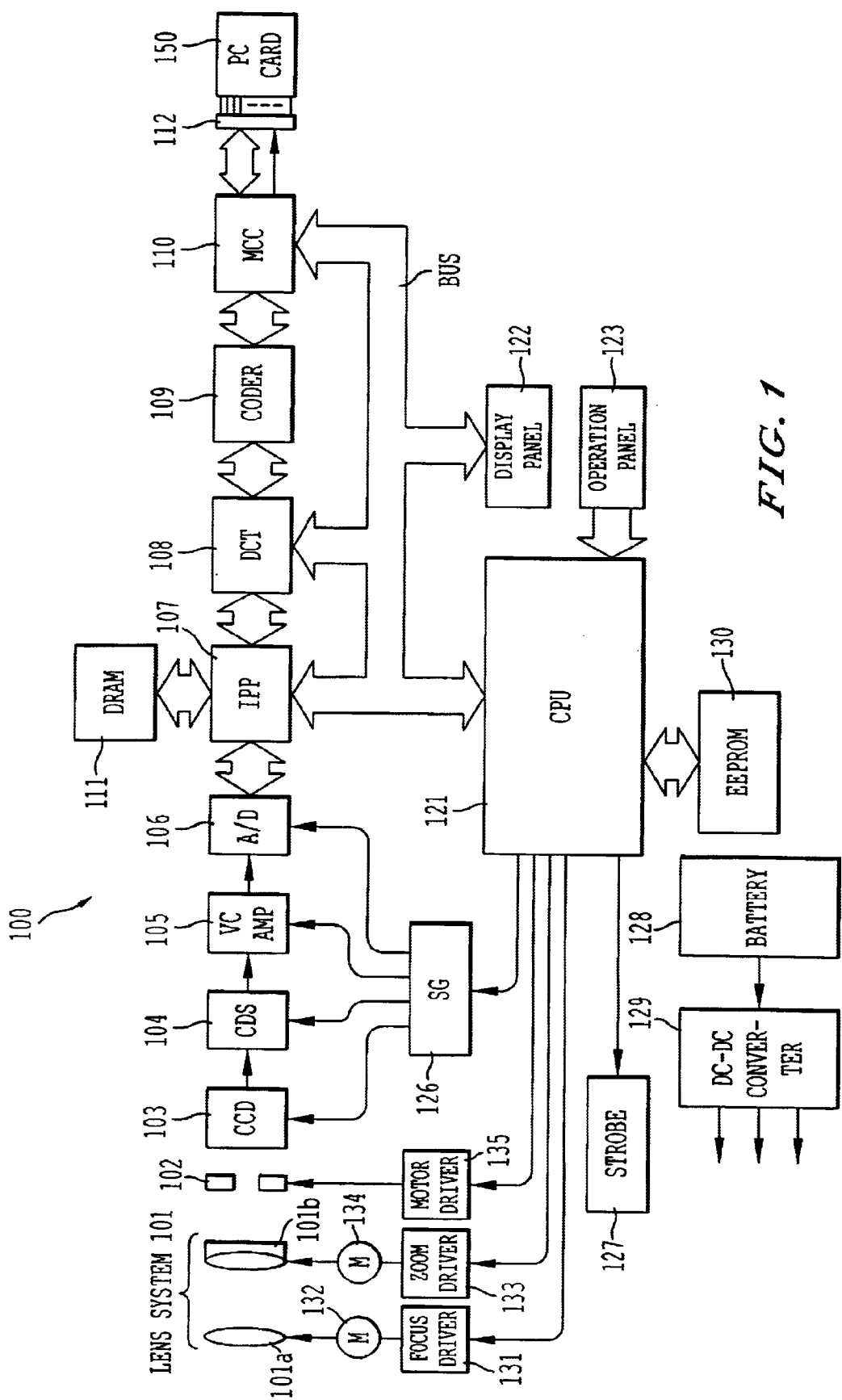
FIG. 1 is a block diagram illustrating the structure of an exemplary digital camera including an automatic focusing device according to the present invention.

While the present invention will hereinafter be described in connection with preferred embodiments thereof, it will be understood that it is not intended to limit the invention to these embodiments. On the contrary, it is intended to cover all alternatives, modifications and equivalents wherein the spirit and scope of the invention are included. Furthermore, in the drawings, like reference numerals have been used throughout the drawings to identify identical elements.

FIG. 1 shows an example of the overall construction of a digital camera including an automatic focusing device to which the present invention is applied. A digital camera 100 includes a lens system 101, an optic mechanical system 102 including an aperture, a filter, and so forth, a charge coupled device (CCD) 103 as an imaging device, a correlate dual sampling (CDS) circuit 104, a variable gain control (VG) amplifier 105, an analog to digital (A/D) converter 106, an image pre-processor (IPP) 107, a discrete cosine transformer (DCT) 108, a Huffman encoder/decoder 109, a memory card controller (MCC) 110, a dynamic random-access memory (DRAM) 111, a memory card interface circuit 112, a central processing unit (CPU) 121, a display panel 122, an operation panel 123, a device control signal generator (SG) 126, a strobe flash 127, a battery 128, a DC-DC converter 129, an electrical erasable programmable read only memory (EEPROM) 130, a focus driver 131, a stepping motor 132 for focusing, a zoom driver 133, a stepping motor 134 for zooming, and a motor driver 135. A memory card 150 can be attached to the camera 100 via the memory card interface circuit 112, and an optional remote control unit (not shown) may be included in the camera 100.

The lens unit of the camera 100 includes the lens system 101 and the optic mechanical system 102. An electronically controlled mechanical shutter that is provided inside the optic mechanical system 102 simultaneously exposes both of two interlaced field images to form a complete raster image of the two field images. The lens system 101 comprises, for example, a variable focal lens which is composed of a focus lens 101a and a zoom lens 101b.

The focus driver 131 drives the stepping motor 132 for focusing according to a control signal provided by the CPU 121 to move the focal lens 101a along its optical axis. The zoom driver 133 drives the stepping motor 134 for zooming in accordance with a control signal provided by the CPU 121 to move the zoom lens 101b along its optical axis. The motor driver 135 drives the optic mechanical system 102 according to a control signal provided by the CPU 121, for example, to set an aperture value.

The CCD imaging device 103 converts optical images, which are input thereto via the lens unit, into analog electrical signals. The CDS circuit 104 reduces noise of the analog electrical signals, and thereby enhances the image quality resulting from the electrical signals. The CDS circuit 104 is particularly tuned to reduce inherent CCD sensor noises, such as thermal noise.

The VG amplifier 105 corrects the amplitude of an analog electrical signal that has been processed by the CDS circuit 104 into a predetermined amplitude. The gain level of the VG amplifier 105 is set by the CPU 121. The CPU 121 first reads digital data, which is provided inside the EEPROM 130 and which defines a relation between a control voltage and a measured gain of the VG amplifier 105, and inputs the read data to a digital to analog (D/A) converter (not shown) built in the CPU 121 to convert the read data to an analog voltage, which is then set at the VG amplifier 105. The A/D converter 106 converts the analog image data from the VG amplifier 105 into digital image data. The A/D converter 106 converts the data with an optimum sampling frequency, such as, for example, a multiple number of the sub-carrier frequency of the NTSC signal format.

The IPP 107, the DCT 108, and the Huffman encoder/decoder 109, functioning as a digital signal processor, separate the digital data which is input from the A/D converter 106 into color-difference data and luminance data, and then perform various processes on the separated data including processes for correcting and converting the separated data into optimum data for compression/decompression. The Huffman encoder/decoder 109 carries out, for example, an orthogonal transformation and a Huffman encoding/decoding for the original digital data, which are required in data compression and expansion in the Joint Photographic Expert Group (JPEG) standard.

The memory card controller (MCC) 110 temporarily stores encoded data therein and then writes the data in the memory card 150 through the memory card interface circuit 112. The MMC 110 also reads out stored data from the memory card 150.

The CPU 121 controls operation of the camera 100 according to instructions input through the operation panel 123 or from the outside of the camera 100, for example, through the optional remote control unit (not shown). The CPU 121 executes the control of the operation of the camera 100 in accordance with a series of program codes (instructions), which are stored in a ROM (not shown) internal to the CPU 121, using a RAM (not shown) internal to the CPU 121 as a working area. More specifically, the CPU 121 controls a photographing operation, an automatic exposure (AE) control operation, an automatic white balancing (AWB) operation, and an automatic focusing (AF) operation.

Power to the camera 100 is input to the DC to DC converter 129 from the battery 128, which includes, for example, a nickel cadmium battery, a nickel hydrogen battery, or a lithium battery. The voltage is converted to an appropriate level by the DC to DC converter 129 and then supplied to the entire camera 100 system.

The display panel 122 includes, for example, a liquid crystal display, a light emitting diode display or an electronic luminescence display, etc. The display panel 122 displays an image of digital image data of a photograph just taken or an image of image data which is compressed and stored in the memory card 150. The operation panel 123 is provided with a plurality of buttons for selecting desired functions and inputting instructions for setting photographing conditions. In addition, the EEPROM 130 contains parameters which the CPU 121 uses in executing the above-mentioned controls.

The camera 100 provides three operational modes, for example, including a monitoring mode, a photographing/recording mode and a displaying mode. The monitoring mode enables displaying an image photographed by the CCD 103 in the display panel 122 before recording the image in the memory card 150. The photographing/recording mode enables photographing an image and storing resulting image data into the memory card 150. The displaying mode enables reading out of stored image data from the memory card 150 and displaying images of the data on the display panel 122.

Figure 2:
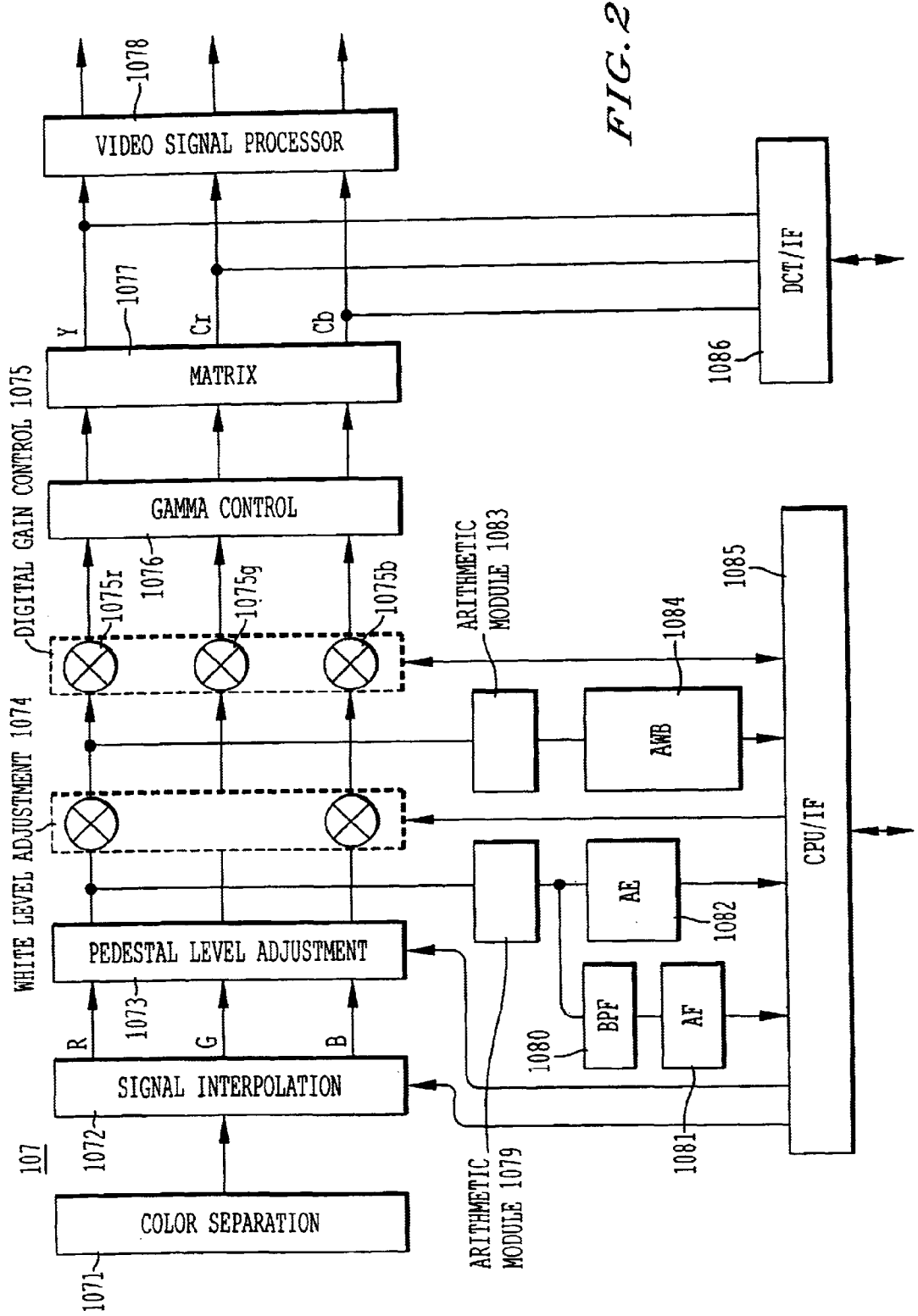
FIG. 2 is a block diagram illustrating an example of an image pre-processor of the camera shown in FIG. 1.

FIG. 2 is a block diagram illustrating an example of the image pre-processor (IPP) 107. A color separation module 1071 separates digital image data from the A/D converter 106 into a set of red (R), green (G), and blue (B) data. A signal interpolation module 1072 interpolates new data in each of the separated R, G, and B data. A pedestal level adjustment module 1073 adjusts a black level of each of the R, G, and B data. A white level adjustment module 1074 adjusts a white level of each of the R, G, and B data. A digital gain control module 1075 adjusts a signal level of each of the R, G, and B data with a gain which is set by the CPU 121. A gamma control module 1076 converts a gamma of each of the R, G, and B data into another gamma. A matrix module 1077 converts the set of R, G, and B data into color-difference signals (Cb and Cr) and a luminance signal (Y). A video signal processing module 1078 converts the Cb, Cr, and Y signals into NTSC format video signals, respectively, and sends out these signals to the display panel 122.

A first arithmetic module 1079 detects the intensity of a luminance signal which is output from the pedestal level adjustment module 1073. A band pass filter (BPF) 1080 passes a specific frequency band of the luminance signal detected by the first arithmetic module 1079. An automatic focusing (AF) evaluation circuit 1081 calculates the integral of digital values according to the luminance signals passed the BPF 1080, and outputs the integral to the CPU 121 as an AF evaluation value. An automatic exposure (AE) evaluation circuit 1082 calculates a digital value (described below) according to the intensity of the luminance signal which is detected by the first arithmetic module 1079 and outputs the value to the CPU 121 as an AE evaluation value. An AE evaluation value represents a difference between the exposure value for an optimum exposure for the sensitivity of the CCD 103 and the exposure value according to the time value (shutter speed) and the aperture value arbitrarily set in an automatic exposure operation. A second arithmetic module 1083 detects the intensity of a luminance signal of each of the R, G, and B data which is adjusted by the white level adjustment module 1074. An automatic white balance (AWB) evaluation circuit 1084 counts each of the luminance data of R, G, and B and outputs the data to the CPU 121 as an AWB evaluation value for each color. A CPU interface circuit 1085 is an interface between the IPP 107 and the CPU 121. A DCT interface circuit 1086 works as an interface between the IPP 107 and the DCT 108.

Figure 3:
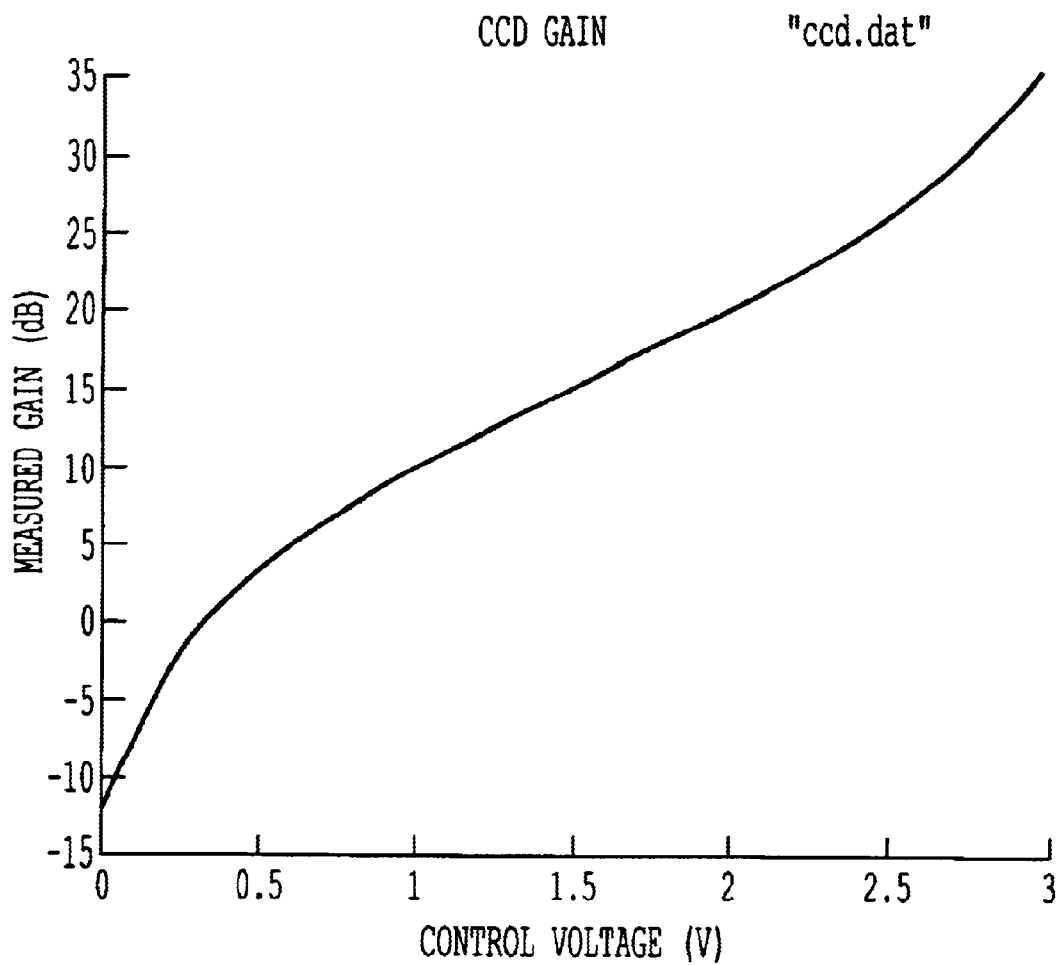
FIG. 3 is a graph illustrating a relation between a control voltage and a measured gain of a variable gain amplifier of the camera shown in FIG. 1.

FIG. 3 is a graph illustrating a relation between a control voltage and a measured gain of the VG amplifier 105. The horizontal axis represents the control voltage and the vertical axis represents the measured gain of the VG amplifier 105, respectively. The data representing this relation is stored in the EEPROM 130.

Figure 4:
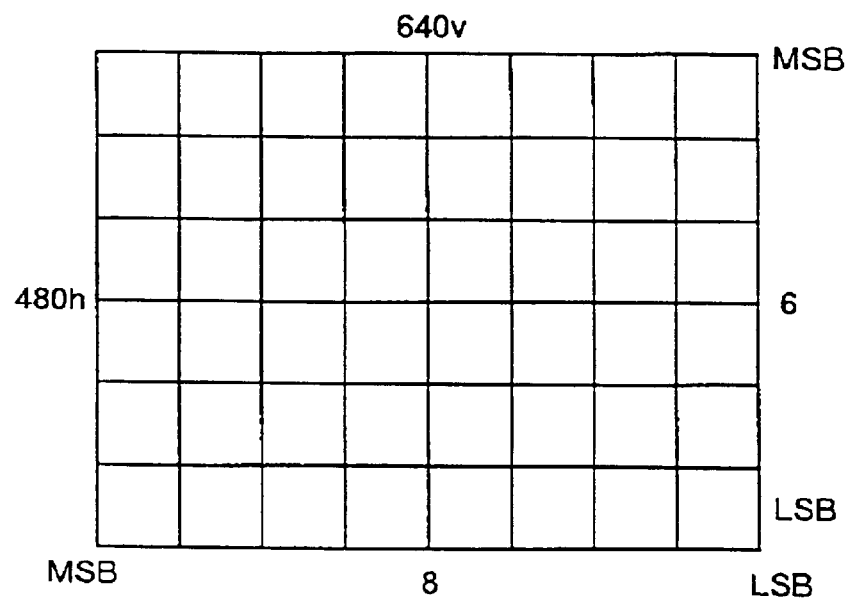
FIG. 4 is a diagram illustrating an exemplary construction of a light receiving area of a CCD as an imaging device.

FIG. 4 illustrates an exemplary construction of a light receiving area of the CCD 103. As illustrated in FIG. 4, CCD elements are arranged in a matrix form, for example, a matrix of 640×480 CCD elements. Furthermore, in this example, the CCD elements are further divided into blocks of 80×80 CCD elements.

Figure 5:
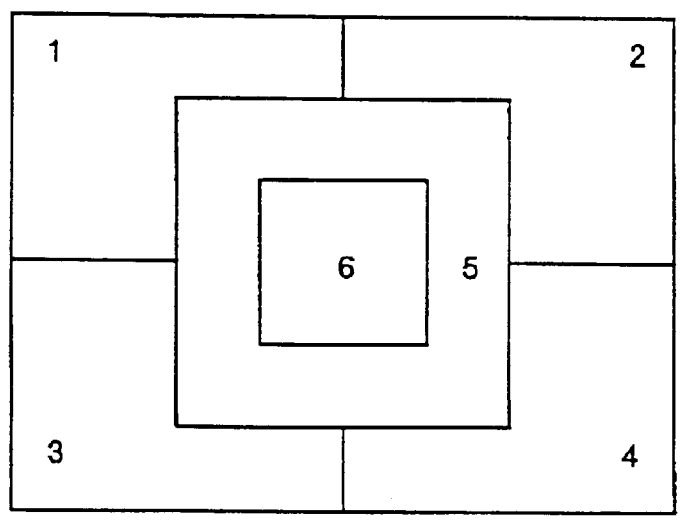
FIG. 5 is a diagram illustrating an exemplary automatic exposure (AE) area used for an automatic exposure control.

FIG. 5 illustrates an example of an AE area used for an automatic exposure control, which is composed of the light receiving area of the CCD 103. The light receiving area of the CCD 103 is divided into 6 areas so as to form sub-AE areas 1–6. The sub-AE area 6 is within the sub-AE area 5. Each of the sub-AE areas 1–4 form a rectangle and a part of each of the sub-AE areas 1–4 overlaps the sub-AE areas 5 and 6, respectively.

The AE evaluation circuit 1082 calculates the AE evaluation value by means of a weighted calculation of luminance values of a set of the above six sub-AE areas 1–6. More specifically, the first arithmetic module 1079 outputs luminance data for each picture element (pixel) of an image received by the CCD 103 to the AE evaluation circuit 1082. The AE evaluation circuit 1082 adds up the received pixel luminance data for each of the six sub-AE areas 1–6 to obtain a luminance value for each area. The AE evaluation circuit 1082 then performs a weighted calculation of the set of six luminance values for the six sub-AE areas 1–6 to obtain a calculated value as the AE evaluation value for the image received by the CCD 103.

Figure 6:
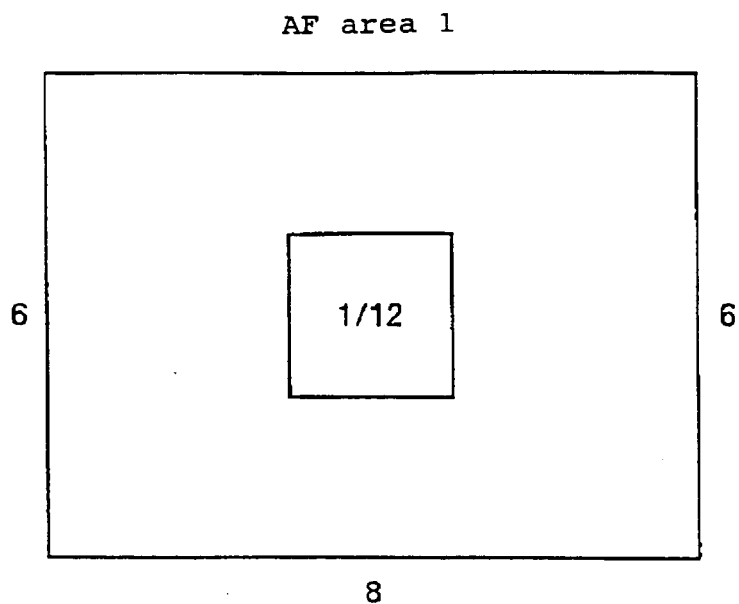
FIG. 6 is a diagram illustrating an exemplary automatic focusing (AF) area used for an automatic focusing control.
Figure 7:
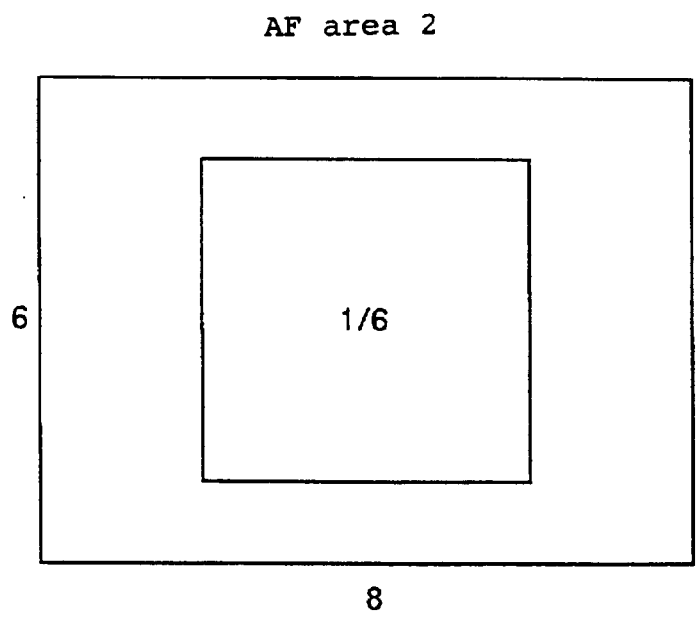
FIG. 7 is a diagram illustrating another AF area used for the automatic focusing control.

FIG. 6 illustrates an exemplary AF area used for determining the AF evaluation value. An AF area I is identical to the sub-AE area 6 in FIG. 5. FIG. 7 illustrates an exemplary AF area used for determining the AF evaluation value when an image to be photographed is dark or low in contrast. An AF area 2 is identical to the AE area 5 in FIG. 5.

As described above, the first arithmetic module 1079 detects the intensity of a luminance signal received by the CCD 103 and the band pass filter (BPF) 1080 passes a high frequency component of the luminance signal. The AF evaluation circuit 1081 then calculates the integral of the digital values according to the luminance signals passed through the AF area to obtain an AF evaluation which is output to the CPU 121.

Next, an operation of the digital camera is explained. Generally, when an image to be photographed includes a plurality of images which are located at different distances, or an image to be photographed is deep or three-dimensional, if the AF area for obtaining an AF evaluation value is large, the image which the photographer desires to focus on is typically not focused. Therefore, the AF area typically cannot be made excessively large. Furthermore, when the image to be photographed is excessively small, the focus typically cannot be adjusted on the image. On the other hand, when an image to be photographed is dark or low in contrast, a precise focusing typically is enabled if the AF area is made large. Accordingly, in this embodiment, when an image to be photographed is dark or low in contrast, even when the image is deep or three-dimensional, the AF area is made large so as to accomplish precise focusing.

In an AE control operation, the CPU 121 controls the shutter speed and the gain of the VG amplifier 105 such that the AE evaluation value becomes a criterion exposure value for an optimum exposure. In this embodiment, for simplifying the explanation the aperture value is fixed at, for example, 4 (i.e., the f-number is 4). Furthermore, in an AF control operation, after the shutter speed and the gain of the VG amplifier are set by the CPU 121, the CPU 121 obtains the AF evaluation value while moving the focus lens 101a via the focus driver 131 by driving the stepping motor 132 with a predetermined number of pulses in a period of 1 Vd. The CPU 121 drives the focusing lens 101a to the focusing position which is determined in accordance with the peak position of the AF evaluation value.

Figure 8:
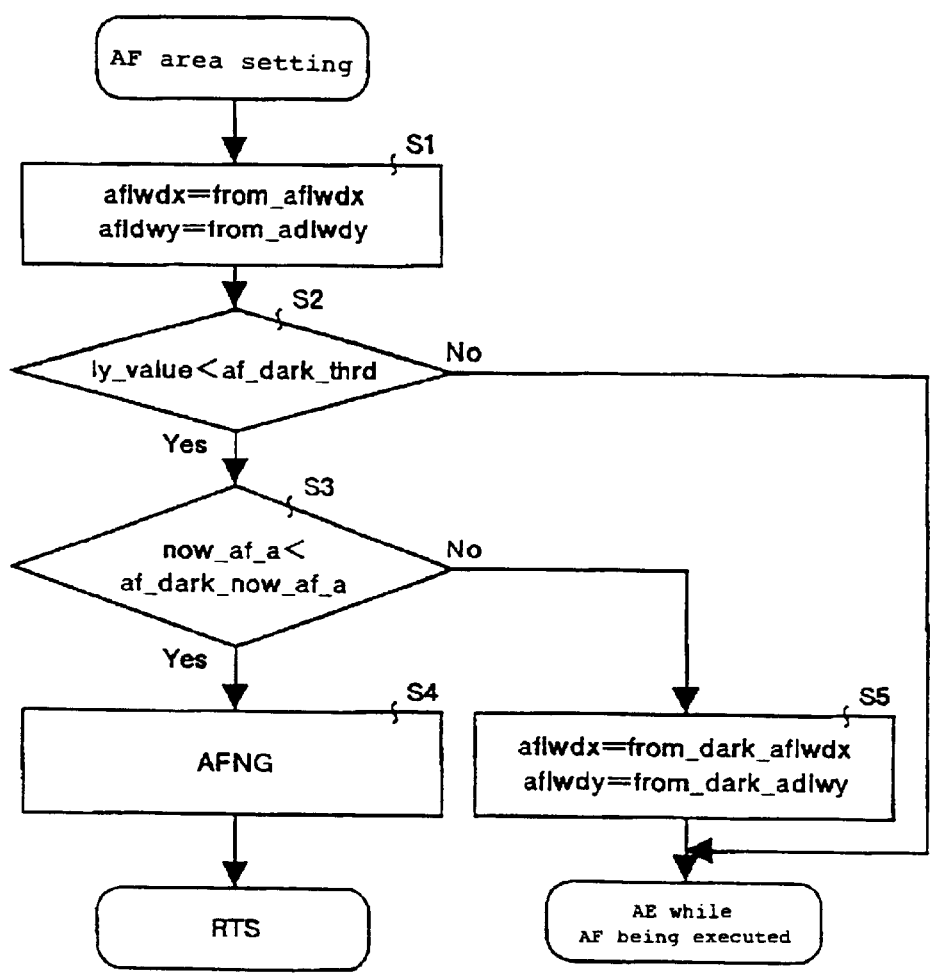
FIG. 8 is a flowchart for explaining an AF area setting operation.

FIG. 8 is a flowchart for explaining an operation for setting an AF area, which is executed by the CPU 121.

In FIG. 8, in step S1, the AF area 1 (FIG. 6) is set in the AF area by registering data values "from_aflwdx" and "from_sflwdy" in registers "aflwdx" and "aflwdy" of the IPP 107. Step S2 then determines if the luminance value Lv ("lv_value") is smaller than a lowest limit value "af_dark_thrd." If the luminance value Lv is not smaller than the lowest limit value "af_dark_thrd," an AE control operation (illustrated in FIG. 9) is performed while the AF control operation is being executed using the AF area 1. If the luminance value Lv is smaller than the lowest limit value "af_dark_thrd," the CPU 121 determines that the image is dark and then in step S3 the CPU 121 determines if the AF evaluation value "now_af_a" is smaller than the lowest limit value "af_dark_now_af_a". If the AF evaluation value "now_af_a" is smaller than the lowest limit value "af_dark_now_af_a," the AF control operation is stopped in step S4. If the AF evaluation value "now_af_a" is not smaller than the lowest limit value "af_dark_now_af_a,"

the process proceeds to the step S5 to register data for setting the AF area 2 (FIG. 7), "from_dark_aflwdx" and "from_dark_af_lwdy," to the registers "aflwdx" and "aflwdy" in the IPP 107. Thus, the AF area 2 is set in the AF area, and the AE control operation (FIG. 9) is performed while the AF control operation is being performed using the AF area 2.

Figure 9:
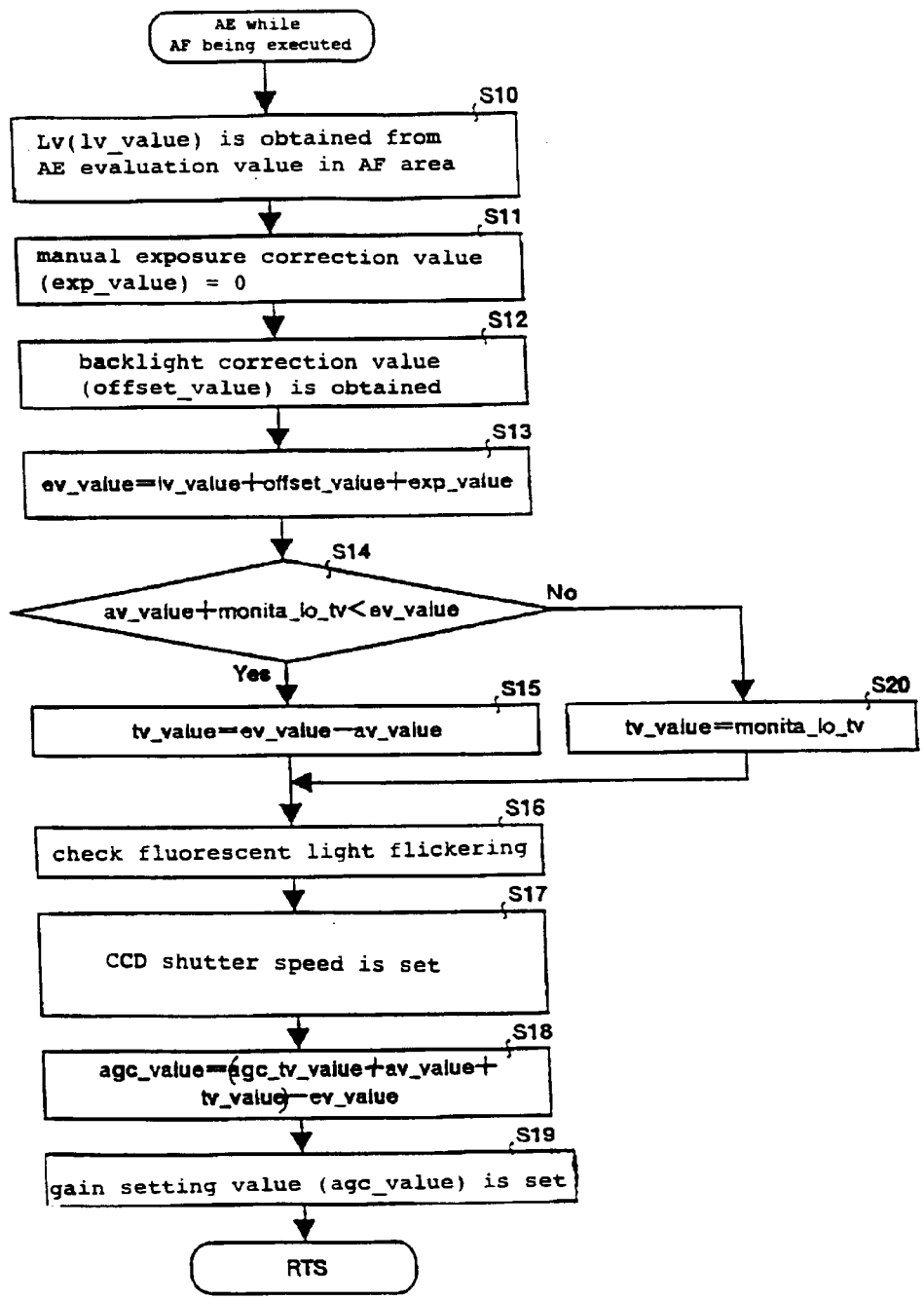
FIG. 9 is a flowchart for explaining an AE control operation which is executed while the AF control operation is being executed.

FIG. 9 is a flowchart explaining an AE control operation which is executed while an AF control operation is being executed by the CPU 121.

In FIG. 9, the luminance value Lv ("lv_value") is obtained in accordance with the AE evaluation value in the AF area (the AE area 6 in FIG. 5) in step S10. Then, a manual exposure correction value ("exp_value") is set to zero in step S11 and a back light correction value ("offset_value") is obtained in step S12. The exposure value ("ev_value") is calculated in step S13 in accordance the following equation:

$$ev\_value = lv\_value + offset\_value + exp\_value$$

Then, in step S14, it is determined if the exposure value ("ev_value") is larger than the sum of the aperture value ("av_value"), which is 4 in this embodiment, and the minimum shutter speed for the monitoring mode ("monita_lo_tv"), which is 1/30 of a second in this embodiment. If the exposure value ("ev_value") is larger than the sum of the aperture value ("av_value") and the minimum shutter speed for the monitoring mode ("monita_lo_tv"), the shutter speed value ("tv_value") is made equal to the difference of the exposure value ("ev_value") minus the aperture value ("av_value") in step S15. If the exposure value ("ev_value") is smaller than the sum of the aperture value ("av_value") and the minimum shutter speed for the monitoring mode ("monita_lo_tv"), then, the shutter speed value ("tv_value") is made equal to the minimum shutter speed for the monitoring mode ("monita_lo_tv") in step S20, and the process proceed to step S116.

In the step S116, flickering of a fluorescent light is checked and the shutter speed for the CCD 103 is set to the minimum shutter speed for the monitoring mode ("monita_lo_tv") in step S17. When the CCD 103 is controlled so as to output a luminance signal only from predetermined CCD elements and disabled from outputting a luminance signal from the other CCD elements, for reducing the period of time of outputting the luminance signals from the CCD 103, the shutter speed for the CCD 103 is set after shifting data for setting the shutter speed in correspondence to the number of the disabled CCD elements.

Then, in step S18, the gain setting value for setting the gain of the VG amplifier 105 ("agc_value") is calculated by summing the VG amplifier correction value ("agc_tv_value") for correcting a quantization error of the shutter, the aperture value ("av_value"), which is 4 in this embodiment, and the shutter speed value ("tv_value") and then subtracting therefrom the exposure value ("ex_value"). Then, the gain setting value ("agc_value") is set at the VG amplifier 105 in step S19. The maximum gain setting value ("agc_value") for the monitoring mode is plus 12 dB, which is equivalent to increasing two steps of the exposure value, and the maximum gain setting value ("agc_value") while the AF control operation is being executed is plus 18 dB, which is equivalent to increasing three steps of the exposure value.

In the monitoring mode, if the gain of the VG amplifier 105 is excessively increased, AE control or AWB control operations typically cannot be accurately performed. Therefore, the gain of the VG amplifier 105 typically cannot be excessively increased in the monitoring mode.

On the other hand, in the AF control operation, the magnitude of the AF evaluation value itself is not required for the control and the AF control can be performed only with information regarding increasing or decreasing of the AF evaluation value. Therefore, when an image to be photographed is dark or low in contrast and if there exists a possibility that the image cannot be in focus, the possibility of focusing the image can be increased by increasing the gain of the VG amplifier 105. Therefore, in this embodiment, when an AF control operation is executed for an image to be photographed which is dark or low in contrast, the gain of the VG amplifier 105 is increased higher than the gain of the VG amplifier 105 in the monitoring mode and thereby the possibility of focusing the image is increased.

Furthermore, because the AF area is generally smaller than the AE area, when only the AF area is dark, if an AF operation is performed using the AE area which is used in the monitoring mode and the AF evaluation value is calculated by integrating the high frequency components of luminance signals which are extracted from luminance signals by the BPF 1080, the AF evaluation value is calculated based upon the luminance signal which is not optimum for the AF area. Therefore, the increase or decrease of the AF evaluation value is small and the accuracy of focusing typically deteriorates. In this embodiment, therefore, an AF control operation is executed after an AE control operation for the AF area is performed.

The mechanisms and processes set forth in the present description may be implemented using a conventional general purpose microprocessor programmed according to the teachings in the present specification, as will be appreciated to those skilled in the relevant art(s). Appropriate software coding can readily be prepared by skilled programmers based on the teachings of the present disclosure, as will also be apparent to those skilled in the relevant art(s).

The present invention thus also includes a computer-based product which may be hosted on a storage medium and include instructions which can be used to program a microprocessor to perform a process in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

This document claims priority and contains subject matter related to Japanese patent application No. 09-336394 filed in the Japanese patent Office on Nov. 19, 1997, the entire contents of which are hereby incorporated by reference.

What is claimed as new and is desired to be secured by Letters Patents of the United States:

1. An automatic focusing device for a digital camera, comprising:
   an optical system including a focusing lens system;
   an imaging device which receives a light flux from an object to be photographed, the received light flux being passed through the optical system to form an image of the object, and converts the received light flux into an output image signal;
   analog-to-digital converting means for converting the image signal to output digital image data;
   automatic exposure (AE) evaluation value outputting means for outputting luminance data according to the digital image data as an AE evaluation value;
   automatic focusing (AF) area setting means for setting at least an area of an imaging screen of the imaging device as an AF area;
   AF evaluation value outputting means for integrating high frequency components of luminance data of the digital image data in the AF area and outputting resulting data as an AF evaluation value;
   AF evaluation value sampling means for enabling the AF evaluation value outputting means to sample AF evaluation values output by the AF evaluation value outputting means while moving the focusing lens system;
   focusing lens driving means for determining if the device is in focus based upon a result of sampling the AF evaluation values and driving the focusing lens system to a focusing position when the device is not in focus; and
   AF area enlarging means for setting an enlarged AF area as the AF area based on a comparison of the AF evaluation value output by the AF evaluation value outputting means to a first predetermined value and based on a comparison of the AE evaluation value output by the AE evaluation value outputting means to a second predetermined value.

2. An automatic focusing device for a digital camera, comprising:
   an optical system including a focusing lens system;
   an imaging device which receives a light flux from an object to be photographed, the received light flux being passed through the optical system to form an image of the object, and converts the received light flux into an output image signal;
   an analog-to-digital converter converting the image signal to output digital image data;
   a luminance value output device processing said digital image data and outputting at least one luminance value;
   an automatic focusing (AF) area setting device setting at least an area of an imaging screen of the imaging device as an AF area;
   an AF evaluation value output device integrating high frequency components of said digital image data in the AF area and outputting resulting data as an AF evaluation value;
   an AF evaluation value sampling device enabling the AF evaluation value output device to sample AF evaluation values output by the AF evaluation value output device while moving the focusing lens system;
   a focusing lens driver determining if the automatic focusing device is in focus based upon a result of sampling the AF evaluation values and to drive the focusing lens system to a focusing position when the automatic focusing device is not in focus; and
   an AF area enlarging device configured to set setting an enlarged AF area as the AF area based on a comparison of the AF evaluation value output by the AF evaluation value output device to a first predetermined value and based on a comparison of the luminance value output by the luminance value output device to a second predetermined value.

3. A method for controlling an automatic focusing device of a digital camera, comprising:
   receiving a light flux from an object to be photographed, the received light flux being passed through an optical system having a focusing lens system to form an image of the object and converting the received light flux into an output image signal;

converting the image signal to output digital image data;

outputting luminance data according to the digital image data as an automatic exposure (AE) evaluation value;

setting at least an area of an imaging screen of an imaging device as an automatic focusing (AF) area;

integrating high frequency components of luminance data of image data in the AF area and outputting resulting data as an AF evaluation value;

sampling AF evaluation values while moving the focusing lens system;

determining if the device is in focus based upon a result of the sampled AF evaluation values and driving the focusing lens system to a focusing position when the device is not in focus; and setting an enlarged AF area as the AF area based on a comparison of the AF evaluation value to a first predetermined value and based on a comparison of the AE evaluation value to a second predetermined value.

4. A method for controlling an automatic focusing device of a digital camera, comprising:

receiving a light flux from an object to be photographed, the received light flux being passed through an optical system having a focusing lens system to form an image of the object and converting the received light flux into an output image signal;

converting the image signal to output digital image data;

processing said digital image data to output at least one luminance value;

setting at least an area of an imaging screen of an imaging device as an automatic focusing (AF) area;

integrating high frequency components of said digital image data in the AF area and outputting resulting data as an AF evaluation value;

sampling AF evaluation values while moving the focusing lens system; and determining if the device is in focus based upon a result of the sampled AF evaluation values and driving the focusing lens system to a focusing position when the device is not in focus; and setting an enlarged AF area as the AF area based on a comparison of the AF evaluation value output in said integrating step to a first predetermined value and based on a comparison of the luminance value output in said processing step to a second predetermined value.

5. A computer readable medium storing computer instructions for controlling an automatic focusing device of a digital camera, by performing the steps of:

receiving a light flux from an object to be photographed, the received light flux being passed through an optical system having a focusing lens system to form an image of the object and converting the received light flux into an output image signal;

converting the image signal to output digital image data;

outputting luminance data according to the digital image data as an automatic exposure (AE) evaluation value;

setting at least an area of an imaging screen of an imaging device as an automatic focusing (AF) area;

integrating high frequency components of luminance data of image data in the AF area and outputting resulting data as an AF evaluation value;

sampling AF evaluation values while moving the focusing lens system;

determining if the device is in focus based upon a result of the sampled AF evaluation values and driving the focusing lens system to a focusing position when the device is not in focus; and setting an enlarged AF area as the AF area based on a comparison of the AF evaluation value to a first predetermined value and based on a comparison of the AE evaluation value to a second predetermined value.

6. A computer readable medium storing computer instructions for controlling an automatic focusing device of a digital camera, by performing the steps of:

receiving a light flux from an object to be photographed, the received light flux being passed through an optical system having a focusing lens system to form an image of the object and converting the received light flux into an output image signal;

amplifying the image signal with a variable gain;

converting the image signal to output digital image data;

converting the image signal to output digital image data;

processing said digital image data to output at least one luminance value;

integrating high frequency components of said digital image data in an automatic focusing (AF) area and outputting resulting data as an AF evaluation value;

sampling AF evaluation values while moving the focusing lens system;

determining if the device is in focus based upon a result of the sampled AF evaluation values and driving the focusing lens system to a focusing position when the device is not in focus; and setting an enlarged AF area as the AF area based on a comparison of the AF evaluation value output in said integrating step to a first predetermined value and based on a comparison of the luminance value output in said processing step to a second predetermined value.

* * * * *